United States Patent [19]
McConnell

[11] Patent Number: 5,701,419
[45] Date of Patent: Dec. 23, 1997

[54] TELECOMMUNICATIONS SERVICE CREATION APPARATUS AND METHOD

[75] Inventor: Von K. McConnell, Springfield, Va.

[73] Assignee: Bell Atlantic Network Services, Inc., Arlington, Va.

[21] Appl. No.: 298,081

[22] Filed: Aug. 31, 1994

Related U.S. Application Data

[63] Continuation of Ser. No. 846,228, Mar. 6, 1992, abandoned.

[51] Int. Cl.$^6$ .............................. G06F 17/60; H04M 3/42
[52] U.S. Cl. ..................... 395/227; 395/226; 395/201; 379/207; 379/211; 379/230
[58] Field of Search ........................ 364/400, 401; 395/154, 161, 226, 227, 201; 379/90, 94, 96, 201, 204, 206, 207, 211, 230

[56] References Cited

U.S. PATENT DOCUMENTS

| | | | |
|---|---|---|---|
| Re. 32,115 | 4/1986 | Lockwood et al. | 235/381 |
| 4,291,198 | 9/1981 | Anderson et al. | 379/96 |
| 4,720,849 | 1/1988 | Tayama . | |
| 4,757,267 | 7/1988 | Riskin | 379/113 |
| 4,775,935 | 10/1988 | Yourick | 364/401 R |
| 4,788,718 | 11/1988 | McNabb et al. | 379/113 |
| 4,817,043 | 3/1989 | Brown | 364/518 |
| 4,823,311 | 4/1989 | Hunter et al. | 364/769.14 |
| 4,897,866 | 1/1990 | Majmudar et al. | 379/94 |
| 4,899,292 | 2/1990 | Montagna et al. | 395/147 |
| 4,905,094 | 2/1990 | Pocock et al. | 358/342 |
| 4,982,346 | 1/1991 | Girouard et al. | 364/550 |
| 5,012,511 | 4/1991 | Hanle et al. | 379/211 |
| 5,056,029 | 10/1991 | Cannon | 364/479.03 |
| 5,105,375 | 4/1992 | Lapeyre | 364/709.16 |
| 5,119,474 | 6/1992 | Beitel et al. | 395/154 |
| 5,128,672 | 7/1992 | Kaehler | 341/23 |
| 5,204,947 | 4/1993 | Bernstein et al. | 395/157 |
| 5,218,633 | 6/1993 | Clagett et al. | 379/144 |
| 5,241,588 | 8/1993 | Babson, III et al. . | |
| 5,247,347 | 9/1993 | Litteral et al. | 358/85 |
| 5,247,571 | 9/1993 | Kay et al. | 379/207 |
| 5,283,638 | 2/1994 | Engberg et al. | 348/14 |
| 5,283,819 | 2/1994 | Glick et al. | 379/90 |
| 5,323,452 | 6/1994 | Dickman et al. . | |
| 5,345,380 | 9/1994 | Babson, III et al. | 364/400 |
| 5,353,331 | 10/1994 | Emery et al. | 379/58 |
| 5,398,045 | 3/1995 | Sach et al. | 345/172 |
| 5,410,343 | 4/1995 | Coddington et al. | 348/7 |
| 5,418,844 | 5/1995 | Morrisey et al. | 379/207 |

OTHER PUBLICATIONS

" 'InfoWindow Display'Shown By IBM At NCC", by Emily Leinfuss, *Management Information Systems Week*, Monday, Jun. 23, 1986, p. 26.
"On Your Screen!" by Lois Schneider, article in *EPB*, vol. 2, No. 5, Sep. 1984, pp. 14–16.
Riggs, Larry—"Direct Marketing Goes Electronic", S&MM, Jan. 14, 1985, pp. 59–60.
Author Unknown—"News and Notes–Video Disc", Video Disc and Optical Disk, Jul.–Aug. 1985, pp. 244–247.
Riggs: "Direct Marketing Goes Electronic".

*Primary Examiner*—Robert A. Weinhardt
*Assistant Examiner*—Joseph Thomas
*Attorney, Agent, or Firm*—Lowe, Price, LeBlanc & Becker

[57] ABSTRACT

A standalone, off network, station or terminal having a video screen and audio output to describe a telephone service to a prospective customer, demonstrate the service, and enable the customer to create a new service or service modification in an unassisted manner. Customer input to the terminal is by touch screen in response to visual and audio prompts. A graphic chart is created to provide flow chart depiction of the service. The console contains a processor, accompanying storage or memory and a large capacity ROM storage preferably in the form of a CDI unit. The terminal may be connected to the network to download service creation data and implement the requested service.

27 Claims, 11 Drawing Sheets

FIG. 11

TELECOMMUNICATIONS SERVICE CREATION APPARATUS AND METHOD

This application is a continuation of application Ser. No. 07/846,228 filed Mar. 6, 1992, now abandoned.

TECHNICAL FIELD

This invention relates to telecommunications systems and services and more particularly to an improved apparatus and method for creating telecommunications services.

BACKGROUND OF THE INVENTION

As telecommunications networks have historically developed the software that defines and implements a telecommunications service or feature is programmed into each switching system by the switch vendors. Switch-generic software also supplies information to the operating systems that service providers use to track, maintain, and administer their networks, and the interfaces between these systems must be considered in service creation.

A new service is usually first defined in marketing terms and then redefined in terms of specific technical implementations prioritized against other services and then deployed. This process, along with planning and developing operations support, is significantly time consuming. There are now under development preliminary versions of intelligent networks which are in the process of deployment as Advanced Intelligent Networks and FIG. 1 illustrates a typical proposed configuration.

Figure 1:
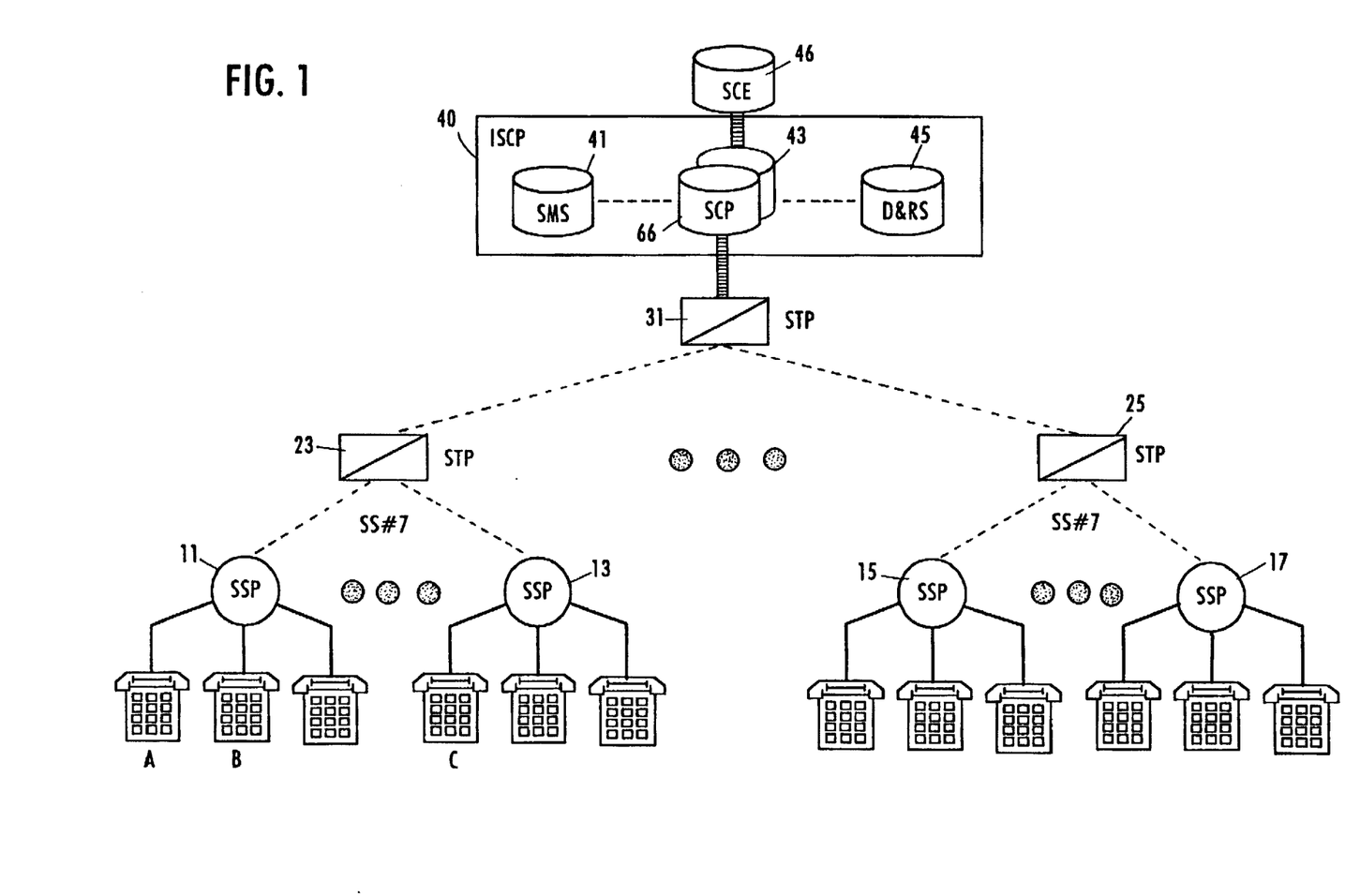
FIG. 1 is a diagrammatic illustration of an AIN network.

FIG. 1 is a schematic block diagram of the components of an AIN showing some detail of the system. In this figure, each of the CO's are labeled as a Service Switching Point, referred to as an SSP. SSP's are appropriately equipped programmable switches present in the telephone network which recognize AIN type calls, launch queries to the Service Control Points (SCP's) and receive commands and data from the SCP to further process the AIN calls.

As shown in FIG. 1, all of the CO's 11, 13, 15 and 17 are equipped and programmed to serve as SSP's. Such central office switching systems typically consist of a programmable digital switch with CCIS communications capabilities. One example of such a switch is a 5ESS type switch manufactured by AT&T; but other vendors, such as Northern Telecom and Siemens, manufacture comparable digital switches which could serve as the SSP's.

The SSP's 11 and 13 connect to a first local area Signal Transfer Point (STP) 23, and the SSP's 15 and 17 connect to a second local area STP 15. The connections to the STP's are for signalling purposes. As indicated by the black dots below STP's 23 and 25, each local area STP can connect to a large number of the SSP's. Although not shown in FIG. 1 the central offices or SSP's are interconnected to each other by trunk circuits for carrying telephone services.

The local area STP's 23 and 25, and any number of other such local area STP's shown as black dots between STP's 23 and 25 communicate with a state or regional STP 31. The state or regional STP 31 in turn provides a communications link with the ISCP 40 (Integrated Service Control Point). The STP hierarchy can be expanded or contracted to as many levels as needed to serve any size area and to service any number of stations and central offices switches. The links 23 and 25 between the CO's and the local area STP's are dedicated CCIS links, typically SS7 type interoffice data communication channels. The local area STP's are in turn connected to each other and to the regional STP 31 via a packet switched network. The regional STP 31 also communicates with the ISCP 40 via a packet switched network.

As shown in FIG. 1, the ISCP 40 is an integrated system. Among other system components, the ISCP 40 includes a Service Management System (SMS) 41, a Data and Reporting System (DRS) 45 and the actual data base of Service Control Point (SCP) 43. The ISCP also typically includes a terminal subsystem referred to as a Service Creation Environment or SCE 46 for programming the data base in the SCP 43 for the services subscribed to by each individual business customer.

Each central office switching system normally responds to a service request on a local communication line connected thereto to selectively connect the requesting line to another selected local communication line. The connection can be made locally through only the connected central office switching system. For example, for a call from station A to station B the SSP 11 provides the call connection without any connection to another central office. When the called line connects to a distant station, for example when station A calls station C, the connection is made through the connected central office switching system SSP 11 and at least one other central office switching system SSP 13 through the telephone trunks interconnecting the two CO's.

The presently envisioned methodology for providing customized telephone services in the AIN network involves a service creation platform connected to the network to access the data and software in the ISCP. The service creation platform is operated or administered by a company operator in communication with a customer to create on the service creation platform a service logic program.

Figure 2:
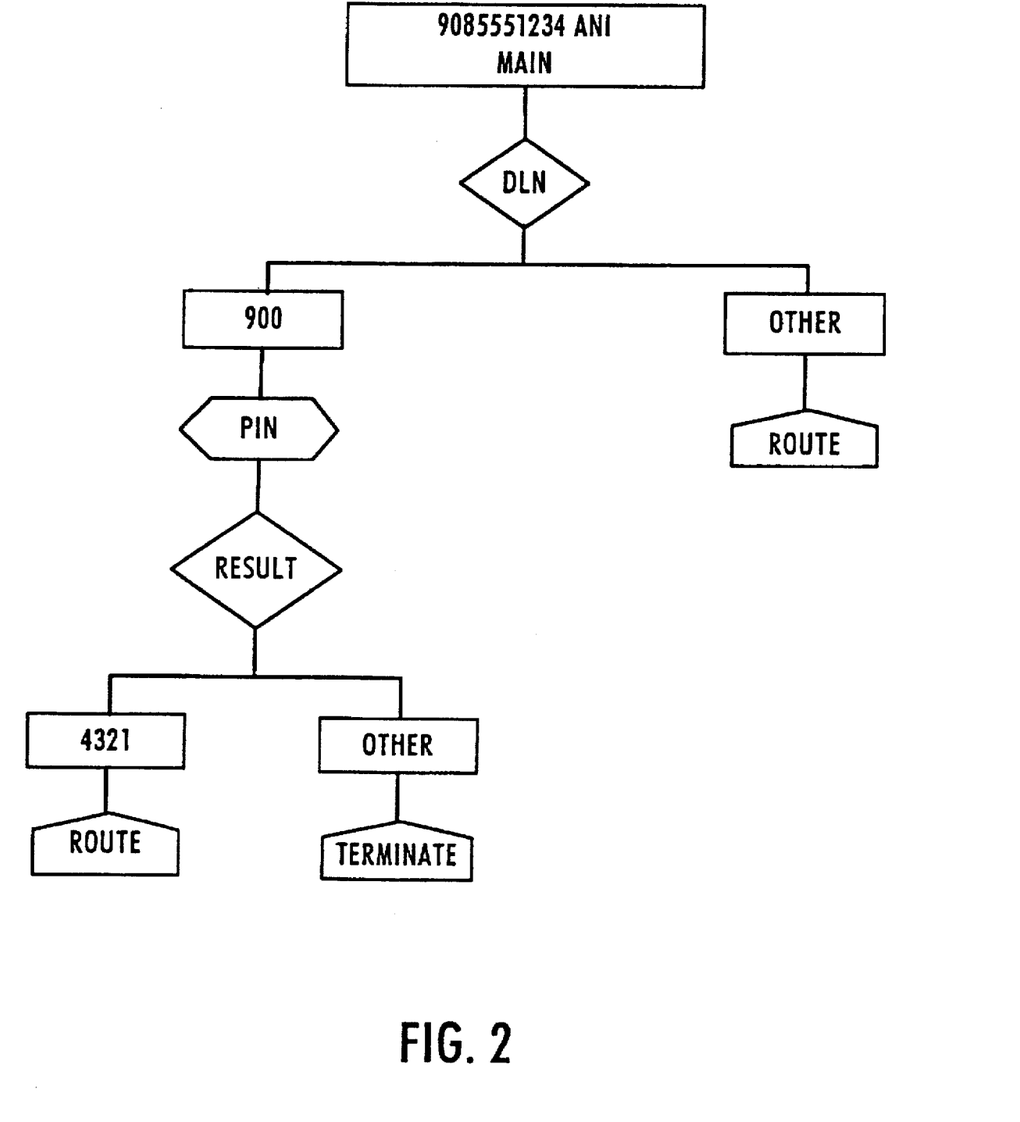
FIG. 2 is a diagrammatic depiction of the structuring of a new service.

Referring to FIG. 2 there is shown a graphic depiction of such a program used to create a call screening service. In this example the set of instructions represented by the service-logic program will instruct the switching system to block 900 number calls from the customer's telephone number 908-555-1234 unless personal identification number (PIN) 4321 is entered. This result is brought about by the operator customer interaction to build a tree or graph of the type illustrated in FIG. 2. The service-logic program thus created will cause the switching system that handles the call from the customer's telephone to play an announcement requesting a PIN if a 900 number is dialed. The call will be routed only if the caller enters the PIN, which has been defined as 4321. Otherwise the call is blocked. All non-900 calls from the telephone are routed as usual. Such a service programming system is described in Bell Core Exchange, January/February 1992 (ISSN0891-4877) Volume 8, Issue 1.

SUMMARY OF THE INVENTION

According to the invention there are provided user friendly, customer operated, off network, standalone stations or terminals which will describe a service to a prospective customer, demonstrate the service to the customer and enable the customer to create a new service or service modification in an unassisted manner in a very short period of time. According to one embodiment of the invention the service advertising, demonstrating and creation station may be provided in a publicly accessible area such as mall or within a retail establishment dealing in communications related merchandise or services. The service station or terminal may comprise a display monitor such as a CRT which is devoid of complex switching mechanisms or controls. Presented in a display on the monitor is an attractive video and audio presentation describing the availability of telephone services and providing additional information about them as well as providing a facility for ordering such services on the spot.

The video/audio presentation may include at appropriate intervals service related graphics which include control buttons and/or icons on the video screen. Simultaneously the viewer/listener is asked to make selections as to whether or not further information regarding specific services is desired or to select among services to be further explained or implemented. A touch screen display is utilized to effect the choice or actuation of implementation buttons. The viewer/listener may also be presented with a numeric or alphanumeric keyboard. Such a keyboard may be utilized for multiple purposes including inputting the directory number of the viewer/listener.

The standalone service creation station is provided with a processor and accompanying RAM and ROM. The station is also provided with a large capacity ROM storage. The processor is programmed to provide promotional and instructional description, interactive visual and audio prompts, to lead a viewer/listener through a pictorial and audible demonstration of selected services, creation of selected services, and documentary confirmation of the transaction where desired.

The service creation station may be provided with periodic connectivity to a cognizant ISCP whereupon the service creation data created in the standalone station is uploaded to the network for service implementation. The periodic connection with the network also may be utilized to update the data contained in the standalone service creation station.

It is accordingly an object of the invention to provide an improved service advertising, description, demonstration and creation system and methodology.

It is another object of the invention to provide such an apparatus and methodology in a standalone device which is independent of the telecommunications network with which it may be associated.

It is yet another object of the invention to provide an improved system and method for creating new services in a telecommunications system wherein such services may be created by customers or potential customers unskilled in the technology of the communications system.

It is another object of the invention to provide such an improved service creation station and method wherein the service creation station may be provided in a variety of forms situated in multiple locales and environments.

It is another object of the invention to provide a standalone interactive telephone service advertising and demonstration station which permits demonstrative creation of a customized enhanced feature or service platform capable of interactive demonstration.

These and further objects and advantages of the invention will become more apparent upon reference to the following specification, claims and drawings wherein:

DETAILED DESCRIPTION OF INVENTION

Figure 3:
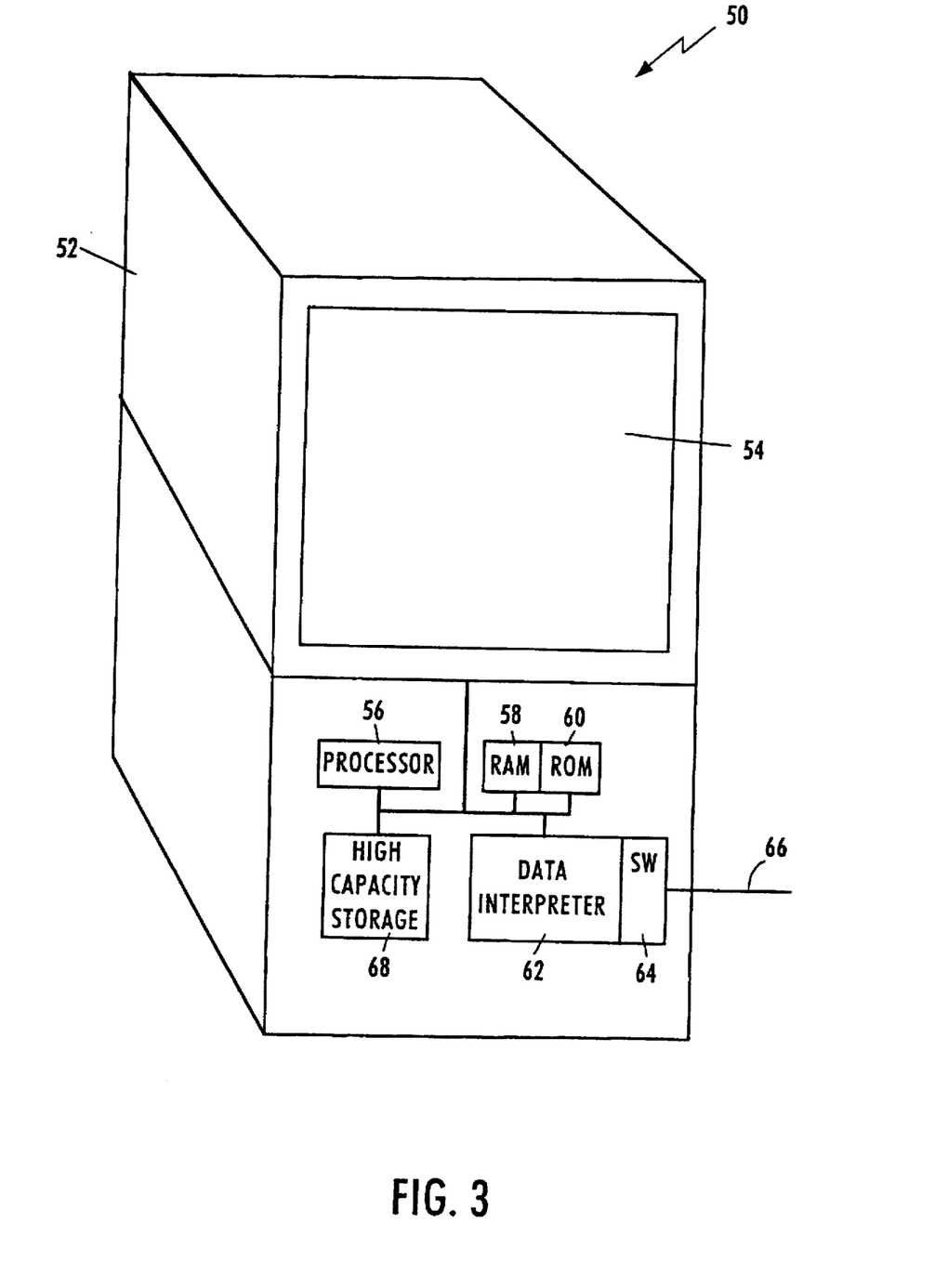
FIG. 3 is a perspective view of a standalone console constructed according to the invention showing in block diagram form the contents thereof.

Referring to FIG. 3 there is shown a standalone console 50 which includes a video monitor or display unit 52 having a screen 54 which is preferably of the touch screen type. The console houses circuitry which is shown diagrammatically as comprising a processor 56 and associated RAM and ROM storage 58 and 60. According to one embodiment of the invention there is also provided a data interpreter 62 and switch 64 which may be connected to a telephone network via a link 66. Also according to another embodiment of the invention there is provided a high capacity storage 68 which is preferably a compact disk interactive (CDI) unit.

Figure 4:
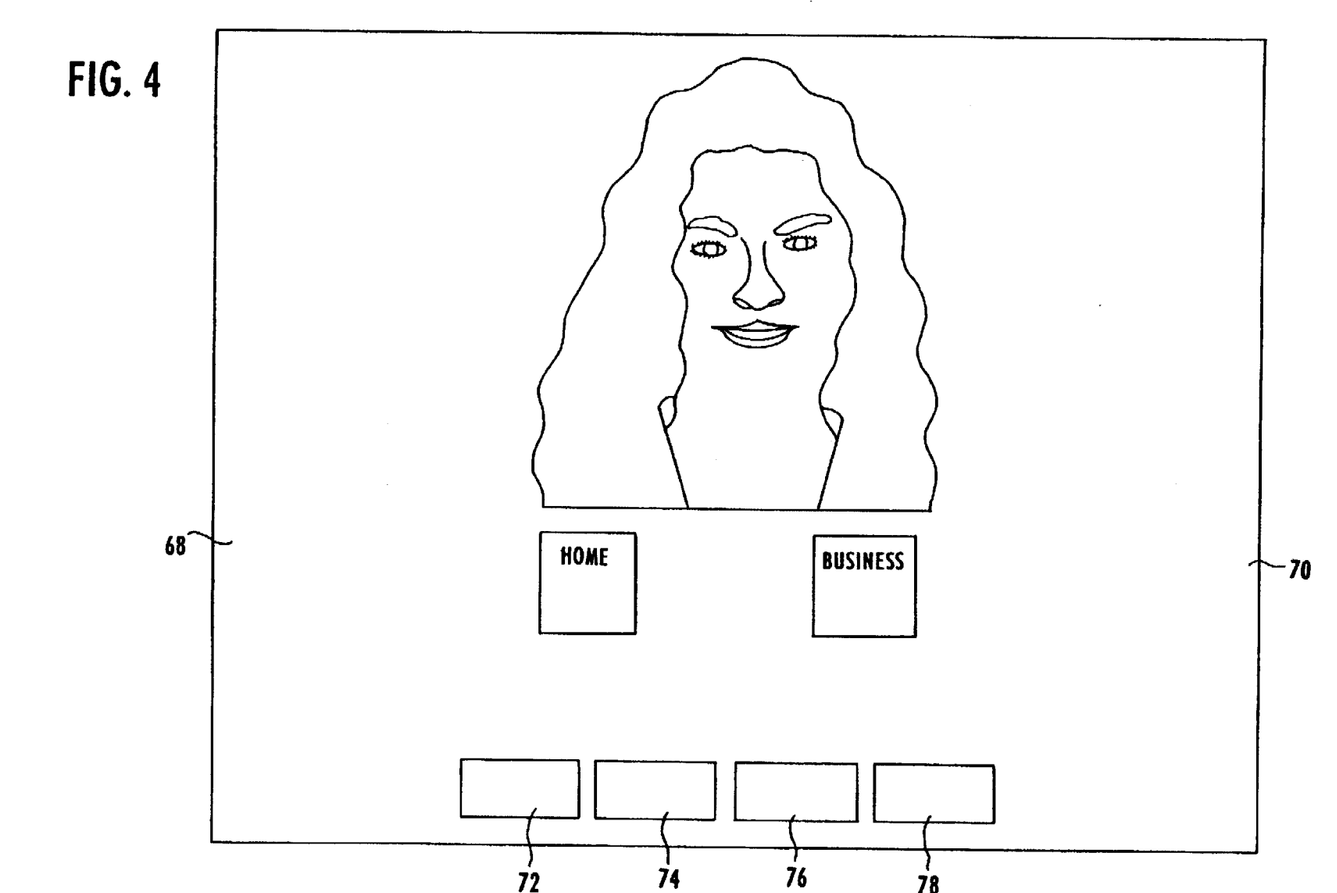
FIG. 4 is a depiction of a representation displayed on the screen of said console.

According to the invention the console 50 may be operated to advertise, describe, demonstrate and create enhanced telephone services in the following manner according to one exemplary embodiment of the invention. In this embodiment the console may be provided as a kiosk type device located in a public area such as in a shopping mall or in a retail establishment handling communication products or services. Interested parties in the area are greeted with an action video which may comprise an actor or actress appearing on the screen 54 and inviting attention to the demonstration. Such a depiction is illustrated in FIG. 4. The actress in FIG. 4 introduces observers to the exhibit and asks them to touch the screen. This triggers the commencement of the descriptive portion of the video presentation wherein the spokesperson or barker welcomes the observer to the service creation exhibit and invites them to learn how to create their own customized service. She calls attention to the buttons on the screen which are illustrated in FIG. 4 at 68 and 70. These buttons bear HOME and BUSINESS legends and the viewer is invited to select one for creation of a telephone service. There are also provided four buttons 72, 74, 76 and 78 wherein buttons 72 and 76 are unlabeled and buttons 74 and 78 are respectively labeled HELP and QUIT. Touching of the HELP button causes the actress to pop back up on the screen and describe all of the buttons. If the QUIT button is touched a fifteen second closing speech plays.

Figure 5:
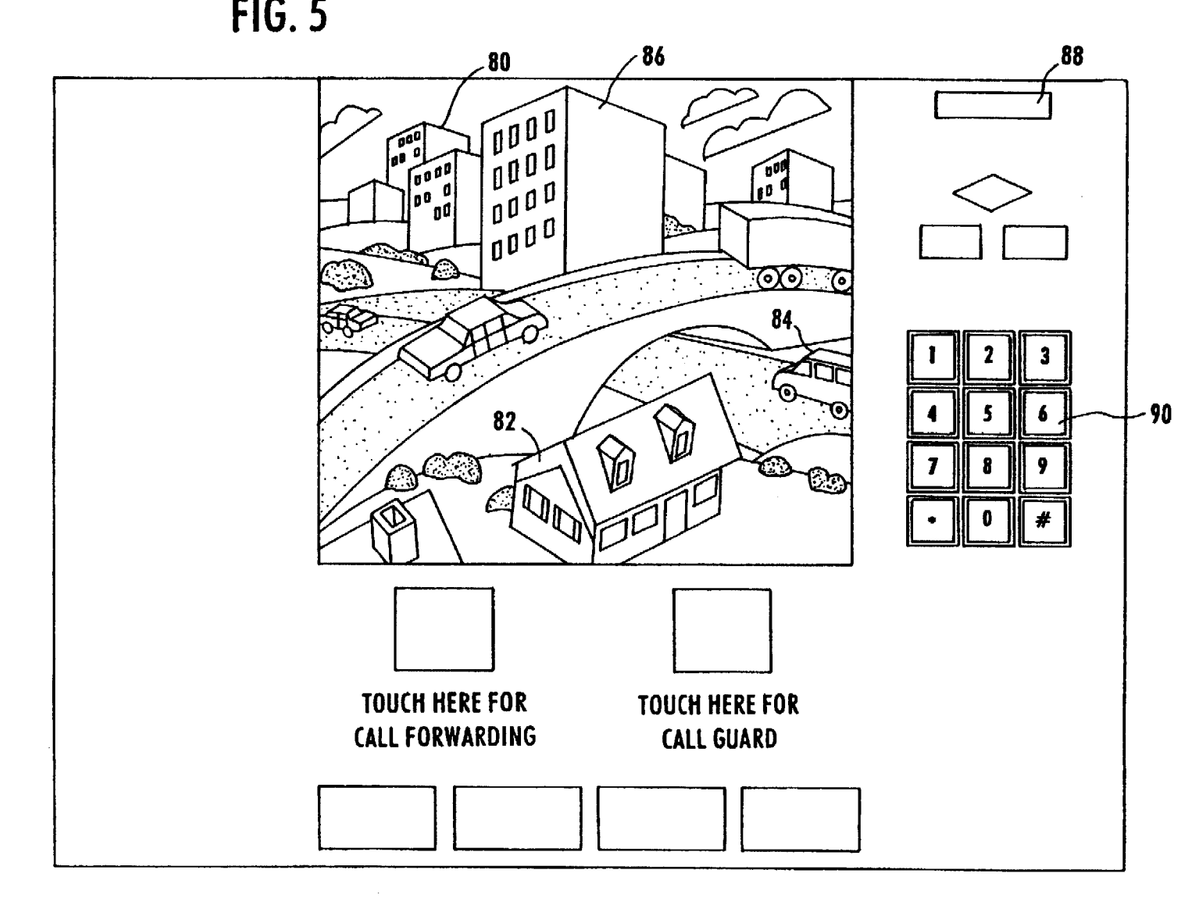
FIG. 5 is a representation of a further depiction presented on the screen of said console.
Figure 7:
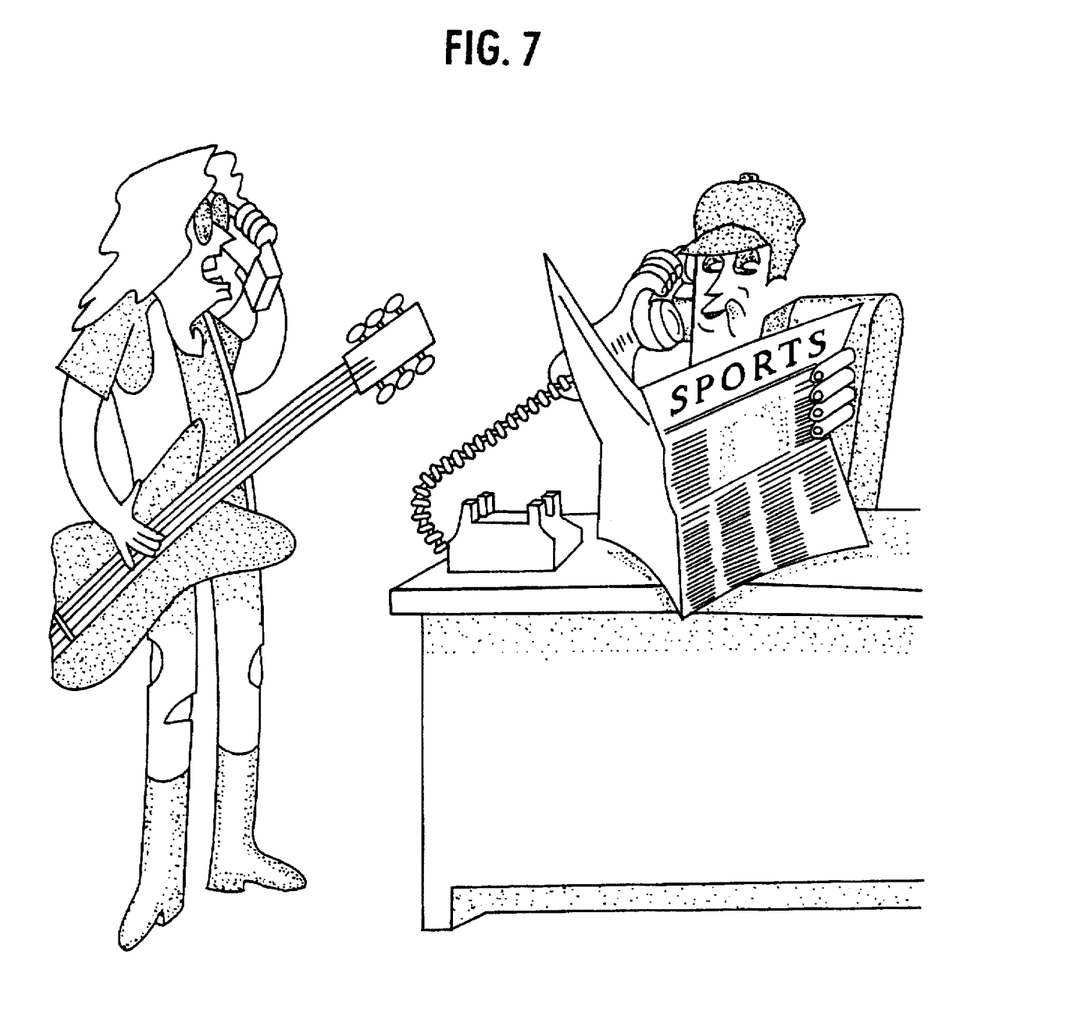
FIG. 7 is a representation of a further depiction presented on the screen of said console.

Assuming that the viewer touches the HOME button a different screen or menu appears. The next screen looks similar to that shown in FIG. 4 in that the actress appears at the top of the screen above the same buttons just described but which now bear different legends. The left button 68 bears a subscription "Touch Here For Call Forwarding", while the right button 70 bears the subscription "Touch Here For Call Guard." The lower most four buttons bear the inscriptions or legends "Restart," "Help," "Previous Menu," and "Quit." The screen then changes and appears as illustrated in FIG. 5. Referring to that figure there is seen a graphic depiction 80 of a home 82 which is preferably labeled HOME, a parked car 84 which is preferably labeled CAR and an apartment building 86 preferably labeled APARTMENT. The same buttons appear beneath the depictions. Following this the HOME, CAR, APARTMENT depiction is replaced by a depiction such as is seen in FIG. 7. The inset depiction in FIG. 5 represents Call Forwarding while an inset depiction as seen in FIG. 7 represents Call Guard.

The narration of the actress now explains AIN and tells the viewer what he/she will see by touching either of the two buttons to select a service. At this time a flash preview comes up showing the picture of the house, car and apartment while she narrates, "You will see a series of pictures which you can touch which will help you create a service." She will describe the call forwarding and call guard buttons, will briefly describe a programming tree or call processing record which will appear at 88 and the telephone touch pad which will appear at 90. Each of these appear for a few seconds as the narration proceeds. The actress next describes the two services and asks the viewer to select one. Assuming that the viewer touches the Call Forwarding button the screen again changes and the new screen is illustrated in FIG. 6.

The actress narrates in a voice-over, "Suppose you are going to be away from home today but are expecting an important call. You will either be with your car phone or at a friend's apartment. First, pick a time of day that you will be away." In the illustrative embodiment there are shown two clocks 92 and 94 which illustrate shaded "away" times of 3:00 to 5:00 and 12:00 to 2:00 respectively. Such a simplified type of time display may be used for advertising and demonstration purposes. In the event of service creation a more detailed menu is presented for the selection of multiple time periods by using menu presentations to designated "start" and "conclude" times for each time period.

Figure 6:
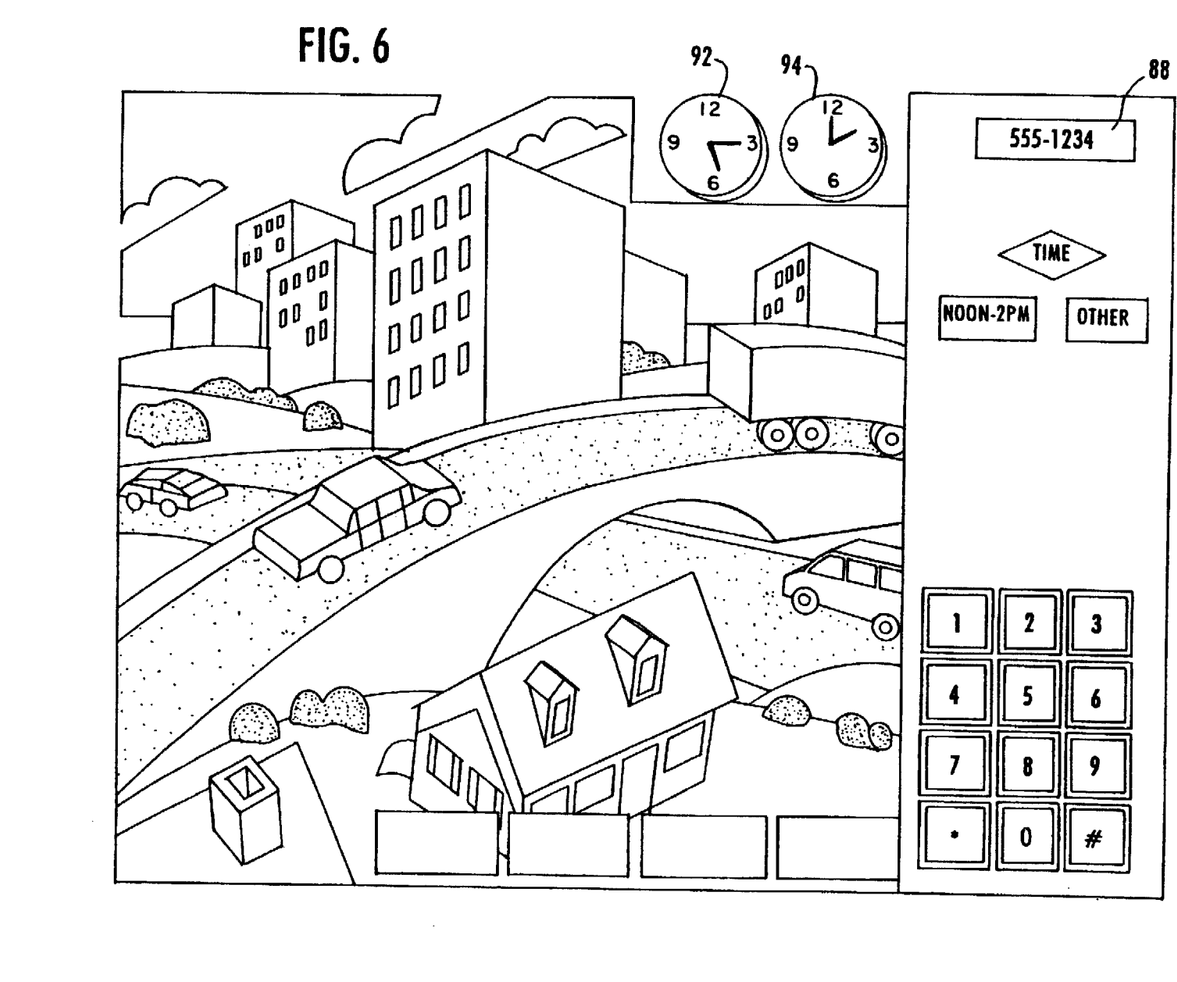
FIG. 6 is a representation of a further depiction presented on the screen of said console.

Returning to the demonstration scenario illustrated in FIG. 6, the viewer may select the 3:00 to 5:00 time frame whereupon the narrator says, "Where do you want your calls forwarded, your car phone or your friend's apartment? Touch your car or your friend's apartment." The viewer touches the figure of the car. As the viewer is doing that the call processing graph on the right at 88 draws a diagram step-by-step to illustrate a correlation between the call processing and the visuals.

The viewer has now selected a time of day and the destination to which the calls are to be forwarded. The narrator now says, "Now we are going to test your service." The clocks now change in the video depiction so that one reads 2:00 p.m. and the other reads 4:00 p.m. The narrator says, "I'll call you. What time should I call? Press the clock to indicate." The viewer touches one of the clocks, such as 4:00 p.m., which is within the time the viewer indicated he/she would be in the car. Thus if the call is placed at 4:00 p.m. it should be routed to the viewer's car. The viewer next hears the sounds of the keypad tones and the numbers on the keypad flash as if they are being dialed. The call processing record in the upper right hand graph shows a red line going through that diagram to wherever the call is being routed. If it goes to the viewer's car there will be a cartoon balloon over the car saying, "Hello." The operation of the call forwarding service has thus been advertised, described and demonstrated.

If the viewer now touches the button "Previous Menu" the screen changes to go back to that shown in FIG. 5 which would permit the viewer to touch the Call Guard button for a description and demonstration of that service also if desired. If that button is then touched a similar scenario ensues describing and illustrating the Call Guard service. In that case the descriptive and demonstrative portion of the graphics and audio may go from the selection screen of FIG. 4 through an intermediate screen of the type shown in FIG. 5 to a final selection screen similar to FIG. 6 but wherein the pictorial presentation may be of the type shown by way of example in FIG. 7. With the aid of the narrator this is described as a manner of creating a Call Guard service to prevent unwanted telephone users such as children from using 900 numbers to access proscribed programs such as indicated in FIG. 7 by the Rock Singer at the left or the Sports Line figure at the right.

As an illustration of the handling of Call Guard the narrator may say: "Controlling calls to your 900 numbers from your home is very important especially if you have young people in your house. With this service you can install a PIN to screen calls leaving the house. Which service would you like to block?" If the user selects the Rock Star he/she touches the Rock Star. The narrator then says, "using the keypad on the screen touch four digits to be your PIN; you have to remember this number." The viewer enters 1234. As the viewer is doing this the call processing flow chart record in the upper right corner of the screen is drawing itself. The narrator next states, "Let's test the service you just blocked." The viewer touches the Rock Star again. There is a phone number under the image. The viewer dials the 1-900-Rock-Star and gets a message which says "Please enter your PIN to complete this call." The viewer enters PIN 1234. Assuming proper entry of the PIN the call will be routed through and the viewer will hear loud music and a greeting "Hello, Dude!" If a wrong number is dialed such as 1243, a message is received, "I'm sorry we cannot complete this call as dialed." (click) The same options apply to the Sports Line. If the Rock Star was blocked and another number was dialed or the Sports Line number was dialed the call would go through and be depicted as such in the graph flow chart. At the same time the pictorial representation of the telephone ringing and answering is provided as described previously in conjunction with the description of the embodiment illustrated in FIG. 6.

Figure 8:
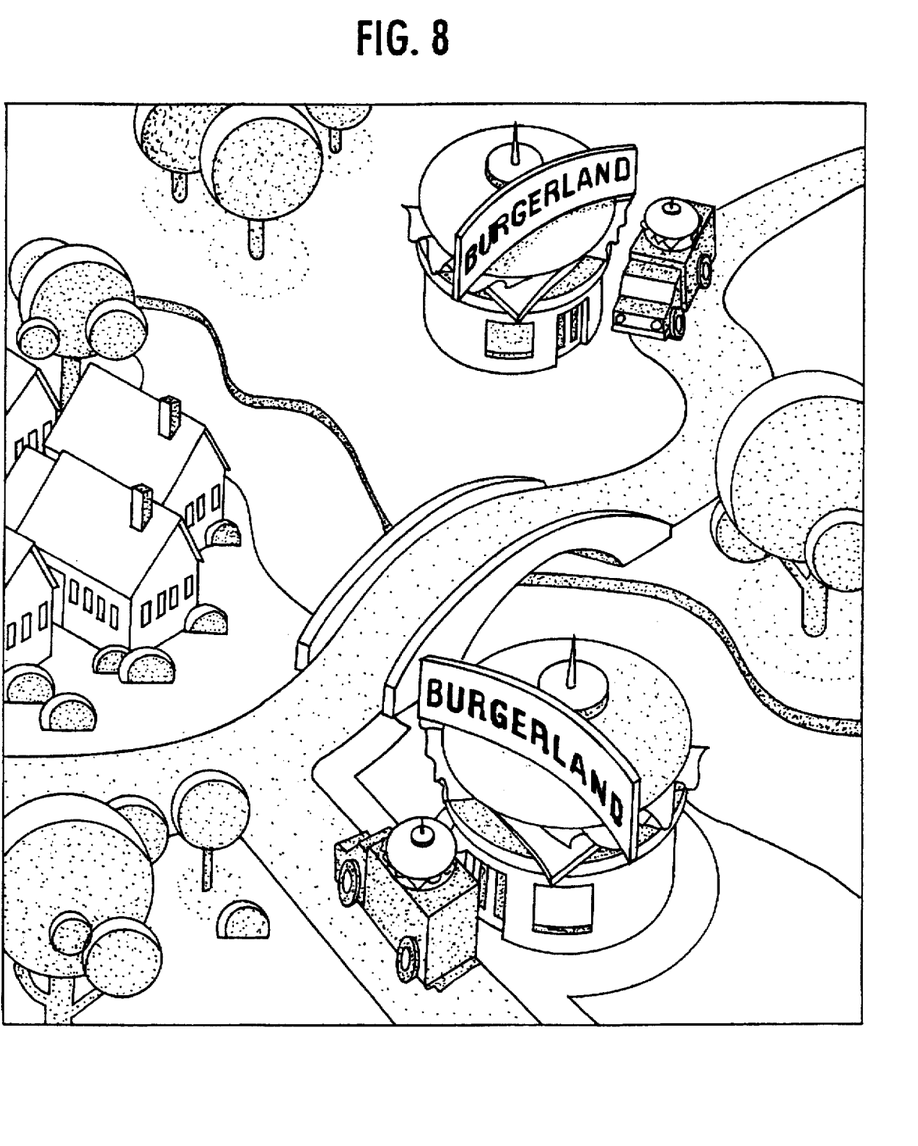
FIG. 8 is a representation of a further depiction presented on the screen of said console.

Other services may also be advertised, described, demonstrated and created by utilizing additional selection buttons of the type illustrated by the two buttons in FIG. 4. Thus referring to FIG. 8 there is seen the graphic presentation which might be utilized to illustrate the Area Number Calling service. That service is utilized to enable a business having multiple retail outlets to predesignate areas to be served by specific outlets to attempt to insure prompt service. In the depiction in FIG. 8 there are shown two Burgerlands on opposite sides of a bridge. The viewer, in the role of the business owner, may be requested to select by touching the screen those areas to be served by each of the retail outlets.

Figure 9:
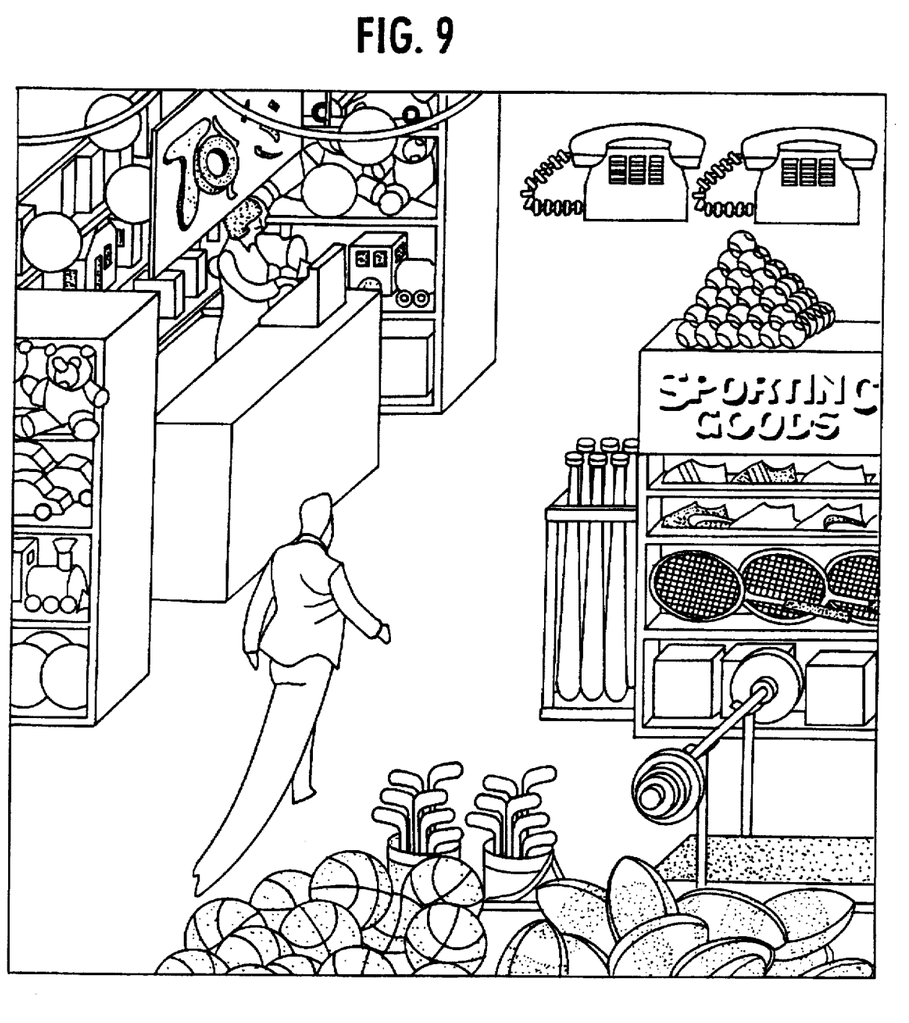
FIG. 9 is a representation of a further depiction presented on the screen of said console.

Referring to FIG. 9 there is an illustration of a graphical depiction which may be utilized to illustrate the enhanced service of Call Distribution. Referring to that figure the interior of a department store is depicted showing a toy department at the left, a sporting goods department at the right and two telephones having different extension numbers. If the viewer again assumes the role of owner he/she may by touching, select the department which each telephone is to serve. In such manner the viewer has actually created his/her own network in terms of how it handles incoming calls by just touching depictions on the screen. The viewer can in effect say, "I want this phone to ring here." "I want that phone to ring there."

In the methodology and use of the console described thus far the user has interacted with the unit in its advertising, descriptive and demonstrating capacity. It is also within the purview of the invention to permit the user to use the console to actually establish or create the desired enhanced services. To this end the foregoing demonstration may be followed with the presentation of a screen eliciting a response to the question as to whether or not a creation and ordering of the service is desired. If the viewer responds in the affirmative the processor and touch screen provide a series of graphical interactions between the console and viewer who is now creating a service. Thus the console is operative to use icons and pull down screens to elicit information from the user in sufficient detail to establish the service parameters. These are then stored in the storage 60. The dialogue and nature of the information necessary to create such a service is described in detail in assignee's U.S. Pat. No. 5,012,511 issued Apr. 30, 1991, describing a Method and System for Remote Programming of Enhanced Services Including Specifically Call Forwarding.

It is inherent in the nature of the enhanced services now available that not all such services can be provided to the same directory number at the same time, i.e., certain enhanced services are not compatible with certain other services. For this reason it is necessary to ascertain what, if any, enhanced services a prospective customer has installed to his directory numbers prior to installing any additional enhanced services. In the usage of the data stored for the creation of service as described thus far the stored data is inputted to a data interpreter 62 in FIG. 3 which translates the data from its stored form into a form suitable for inputting to the telephone network. The console may be provided with a switch 64 which is connected to a link 66 to the telephone network, such as the network illustrated in FIG. 1.

The information regarding the services currently in effect at the user's directory number and thus the identity of additional services which may be added may be ascertained by accessing the SCP and SCE 43 and 46. According to one embodiment of the invention for service creation and implementation the data interpreter is preferably connected by switch 64 and link 66 to the SCP 43. As previously described the signals to the SCP are in packet format and the data interpreter is constructed to effect this translation from the raw data received from the storage 60-62. At the time of connection of the console to the network the determination is made as to whether or not the requested service is compatible and, if so, the necessary programming is carried out by the SCP/SCE to implement that service. In the event that the service is not compatible an appropriate response is delivered to the console and/or to the prospective customer advising as to the necessity of selecting between two incompatible services. As an alternative to connecting the console directly to the SCP it is also possible to use a POTS line and connect to an SSP or central office. As a still further alternative the standalone console may be accessed by an attendant to download the service creation data which then may be physically transferred, as in a floppy disk, to the central office for loading into the network.

Figure 10:
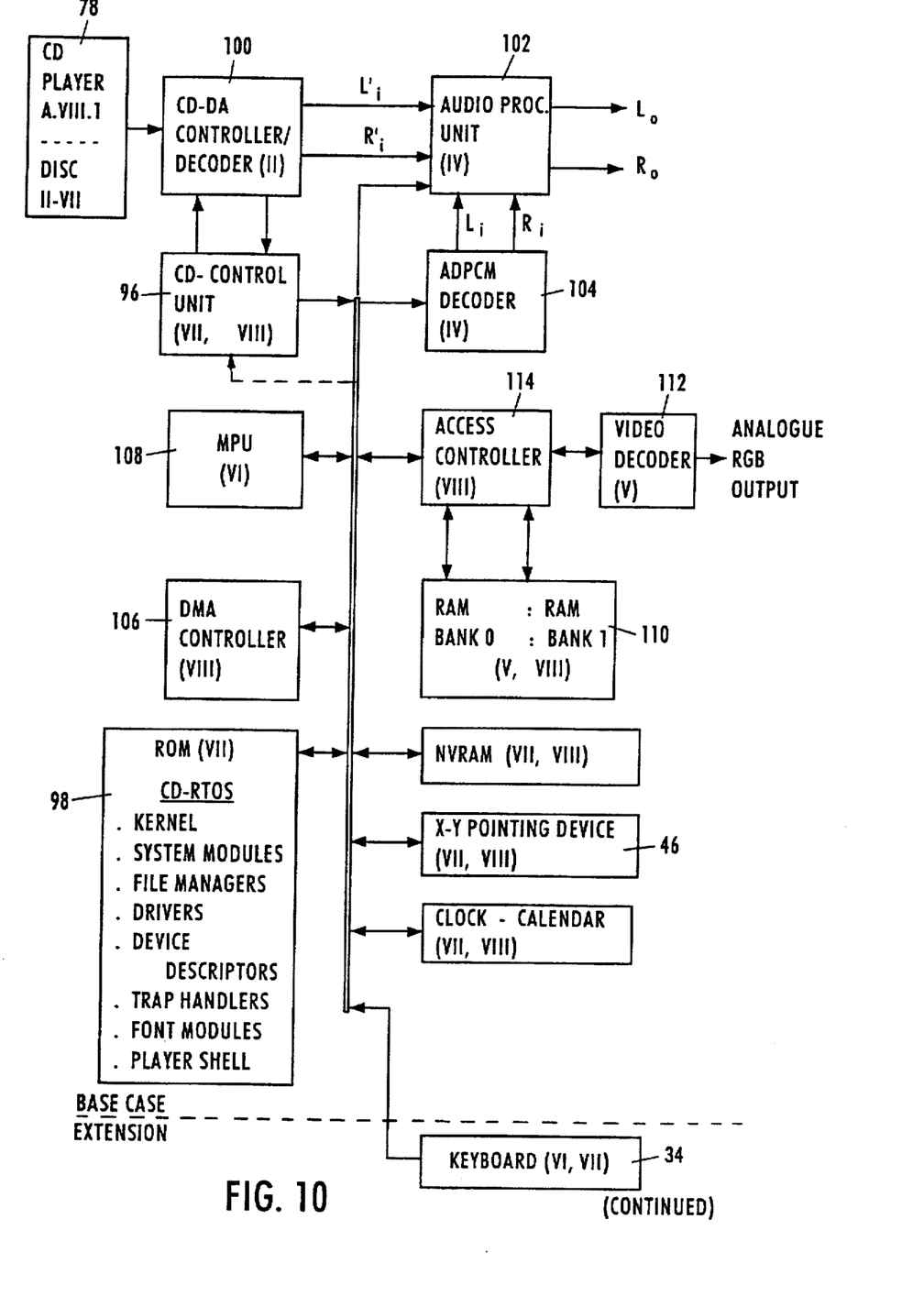
FIG. 10 is a block diagram of the base case model of a Compact Disk Interactive (CDI) system used according to the invention.
Figure 11:
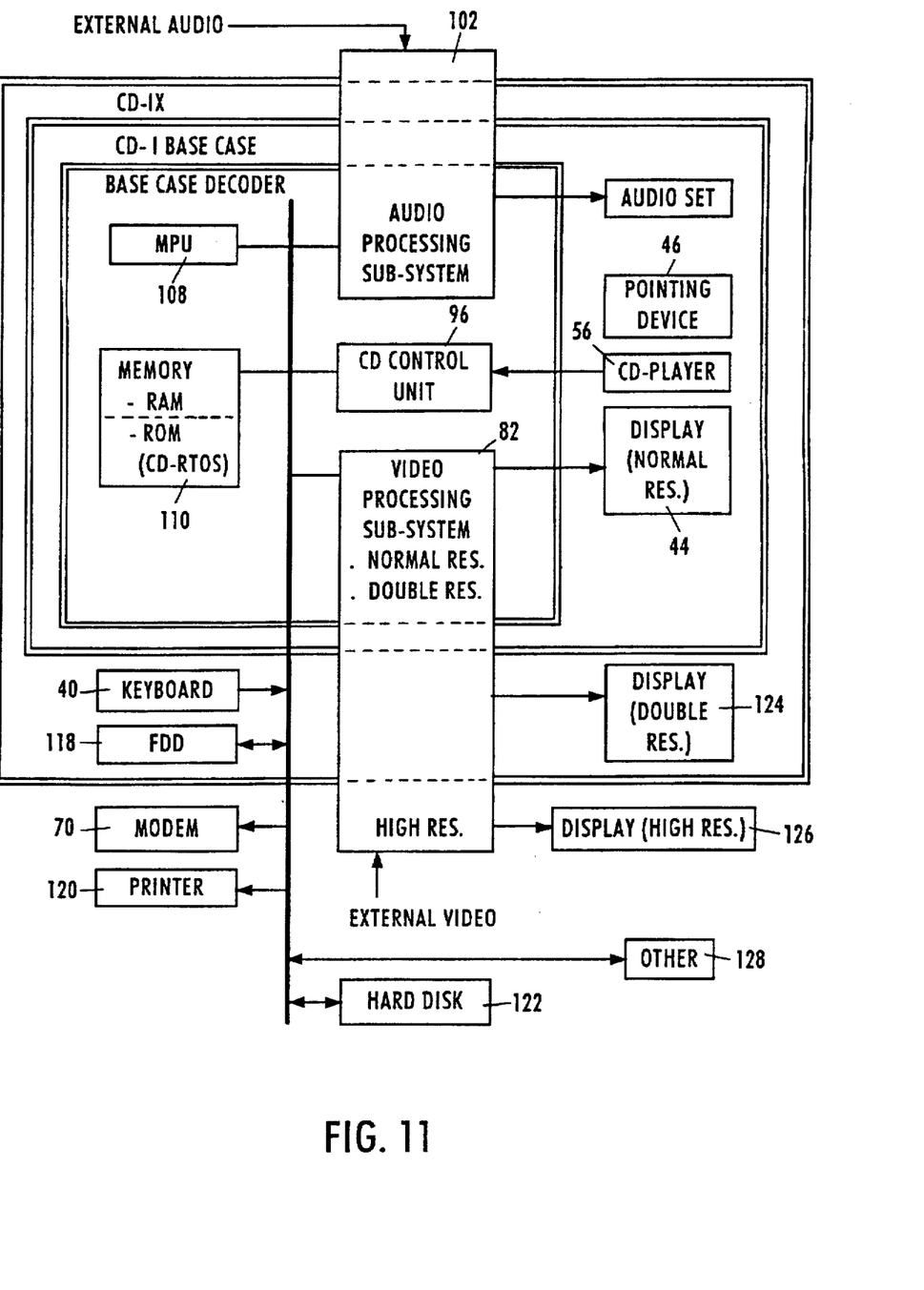
FIG. 11 is an illustration of the CDI base case broken down into a CDI base case decoder and CDI base case peripherals.

According to a further embodiment of the invention the standalone console 50 is provided with a high capacity storage 68 which is capable of storing a copy of the data in the SCP/SCE indicating the current status of enhanced features or services available to directory numbers served by the network to which the console is connected, such as the network illustrated diagrammatically in FIG. 1. This may be accomplished by utilizing for the high capacity storage 68 a Compact Disk Interactive (CDI) installation of the type illustrated in FIGS. 10 and 11.

The CDI portion of the unit is a real-time system capable of playing CDI disks and decoding the various types of data (i.e., audio, video, text, program related data) from the disk. CDI is the name given to both the Compact Disk Interactive media (the disk) and the Compact Disk Interactive media system (the hardware) that conform to the specifications available in the Compact Disk Interactive Full Functional Specification ("Green Book"), N. V. Philips and Sony Corporation, September 1990. That specification also complies with the specifications defined in the CD-Digital Audio (CD-DA) Specification ("Red Book"), N. V. Philips and Sony Corporation. See also the OS-9 Technical Manual portion of the Green Book, Microware Systems Corporation, 1990. Such specifications are herewith incorporated by reference.

A CDI system is made up of hardware and system software which conforms to the CDI Base Case specification detailed in Chapter VIII of the above cited Green Book. The Base Case model is illustrated in FIG. 9. Referring to that figure, the CD-Control Unit 96, in response to commands from the operating system (i.e., CD-FM of CD-RTOS 98), accesses the disk via the CD-DA Controller/Decoder 100. When CD-DA tracks are being accessed the data is transferred directly to the Audio Processing Unit 102 whose function is to control the attenuation, set the panning and output to analog audio left/right signals where stereo signals are being generated.

If a CDI track is being accessed the CD-Control Unit 96, in response to commands from the operating system (i.e., CD-FM 98), selects sectors from the data stream and transfers the CDI sectors to the ADPCM decoder 100 (for direct audio playback) or, via the system bus, to memory (for audio, video or program related data). Audio data is usually routed continuously to the ADPCM decoder which decodes it in real-time to produce analog audio, which is output via the Audio Processing Unit 102. Video and program related data as well as audio data to be stored in a soundmap is routed, by means of the DMA controller 106 MPU 108, to RAM 110.

The RAM is organized as two separate banks each of a minimum size of 512 Kb, which is shared between MPU 108 and video decoder 112 by an Access Controller 114. Although the amount of memory used by CD-RTOS 98 and the system modules will vary depending upon the number of processes active and the number of open paths, it is guaranteed at start-up of the application to be less than 64 k, split evenly between the two banks. All other RAM may be used for either audio, video or program related data.

Video data consists of both pixel data and video control data. The display of pixel data from RAM is by means of a two path display controller. Video data is accessed independently in the two banks of RAM, and the two display paths are combined to produce a single analog RGB video output from the video decoder 112.

The operating system (CD-RTOS) is contained in ROM. Moreover, there is a small area of non-volatile RAM which is available both to the operating system and application programs.

The CDI Base Case is illustrated in FIG. 15 broken down into a CDI Base Case decoder and CDI Base Case peripherals. The CDI Base Case decoder is the nucleus of the system and comprises the microprocessor 108, audio processor 102, video processor 102, memory 110 and CDI control unit 97. CDI peripherals comprise input and output devices used in connection with the CDI Base Case decoder.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

I claim:

1. A public communications terminal for advertising or ordering services offered by an Advanced Intelligent Network (AIN) telephone system having an integrated service control point (ISCP) operatively connected via control-signal channels to Service Switching Points (SSP), and a service creation environment (SCE), said terminal comprising:

a connection to a servicing telephone landline contained in said AIN and connected to an SSP;

a display, including video and audio output devices, and configured to graphically display a region having a plurality of separate areas and served by a plurality of separate user facilities, each said user facility being associated with a unique subscriber telephone line other than said servicing telephone landline;

a processor including storage means for storing operating and program data;

said processor being responsive to said data for controlling said video/audio output means to present to a user of said terminal a video/audio depiction of available services for service selection and input of parameters;

input means associated with said video output means and responsive to actuation by a user for generating signals defining selection and parameter inputs by said user wherein, responsive to actuation by the user, an area within a displayed region to be served by an associated one of the plurality of separate facilities is selectable;

interface means for receiving said signals and translating said signals into data defining services and service parameters, and for storing said data in said storage means; and means for downloading said data to said SCE through said ISCP to effect service changes to the associated subscriber telephone lines other than said servicing telephone landline, wherein service is changeable such that service orders originating from a selected area are directed to the facility associated with said selected area.

2. The terminal according to claim 1 wherein said operating and program data in conjunction with said processor effect output from said display including service advertising, service description and instructions for using said terminal for arranging a service.

3. The terminal according to claim 1 wherein said input means includes a touch screen on said video device.

4. The terminal according to claim 1 wherein said input means includes mouse driven selection device.

5. The terminal according to claim 1 wherein at least certain of said data stored in said storage means has been input from a medium supplied by a telephone service provider.

6. The terminal according to claim 1 wherein said processor responsive to stored program data and data input by said user controls said video device to display a step-by-step graphical depiction of the creation of a service selected and defined by said user.

7. The terminal according to claim 6 wherein said processor responsive to stored program data and data input by said user controls said video device to provide a demonstration of the operation of the service selected and defined by said user.

8. The terminal according to claim 1, further comprising a switch, and means for actuating said switch to connect said terminal to said AIN and transfer to said AIN data from said storage in said terminal to install the selected service for use.

9. The terminal according to claim 1, further comprising a high capacity storage means having stored therein data indicating the current service feature status of subscriber telephones to said AIN, said processor arranged for accessing said data in said high capacity storage means responsive to a user input of a directory number.

10. A public communications terminal for advertising or ordering enhanced telephone services offered by an Advanced Intelligent Network (AIN) telephone system having an integrated service control point (ISCP) operatively connected via control signal channels to Service Switching Points (SSP), and a service creation environment (SCE), said terminal comprising:

a connection to a servicing telephone landline contained in said AIN and connected to an SSP;

a display, including video and audio output devices, and configured to graphically display separate areas within a facility having an associated plurality of communications devices, each said area having an associated service responsibility;

a processor including storage means for storing operating and program data;

high capacity storage means for storing data indicative of an enhanced service feature status of communications devices served by said AIN;

said processor being responsive to said data for controlling said video/audio output devices to present to a user of said terminal a video/audio depiction of available enhanced services for service selection and input of parameters;

input means associated with said video output devices and responsive to actuation by a user for generating signals defining selection and parameter input by said user in response to queries from said display wherein, responsive to actuation by the user, an area within said facility to be served by an associated one of said plurality of communications devices located within said facility and connected to a unique subscriber telephone line is selectable;

interface means for receiving said signals and translating said signals into data defining enhanced services and service parameters and for storing said data in said storage means; and means for downloading said data to said SCE through said ISCP to effect service changes to subscriber telephone lines other than said servicing telephone landline, wherein service is changeable such that, orders for a service corresponding to the service responsibility associated with a selected area are directed to the communications device associated with said selected area.

11. The terminal according to claim 10 wherein said input means responsive to input of a directory number by said user generates signals defining selection and parameter inputs by said user in response to queries from said display which are responsive to said enhanced service feature status data stored in said high capacity storage means to insure compatibility of enhanced services offered to said user.

12. The terminal according to claim 10 wherein said operating and program data in conjunction with said processor effect output from said display including animated video and graphic depictions for implementing selection and parameter inputs by said user.

13. The terminal according to claim 12 wherein said input means includes a touch screen on said video device.

14. The terminal according to claim 13 wherein processor responsive to stored program data and data input by said user controls said video device to display a step-by-step graphical depiction of the operation of the service selected and defined by said user.

15. The terminal according to claim 12 wherein said input means includes a mouse driven selection device.

16. The terminal according to claim 12 wherein said processor responsive to stored program data and data input by said user controls said video device to display a step-by-step graphical depiction of the creation of the service selected and defined by said user.

17. The terminal according to claim 12, further comprising a switch and means for actuating said switch to connect said terminal to said AIN and transfer to said terminal data from said AIN to update data stored in said high capacity storage means.

18. The terminal according to claim 10 further comprising a switch and means for actuating said switch to connect said terminal to said AIN and transfer to said network data from said stored information in said terminal to install the service selected by said user for use.

19. A method of using a terminal for advertising and ordering services in an advanced intelligent network comprising:

describing service options in a multi-media program;

permitting a user to select service options;

presenting an audio-visual program illustrating operation of service options selected by the user; and transmitting a representation of a service having the service options selected by the user to said advanced intelligent network for implementation;

wherein said selected service options include changing the service such that service orders originating from one of a plurality of separate geographic areas designated by the user are directed to one of a plurality of separate service facilities associated with the designated geographic area, each said user facility being associated with a unique subscriber telephone line other than said servicing telephone landline or service orders for service corresponding to a service responsibility associated with one of a plurality of separate areas within a single facility, said single facility having an associated plurality of communications devices, designated by the user are directed to one of said plurality of communications devices within said user facility which is associated with the designated area and connected to a unique subscriber telephone line.

20. A method for advertising or ordering services offered by an Advanced Intelligent Network (AIN) telephone system having an integrated service control point (ISCP) operatively connected via control-signal channels to Service Switching Points (SSP), and a service creation environment (SCE), comprising the steps of:

connecting a terminal to a servicing telephone landline contained in said AIN and connected to an SSP;

displaying to a user of said terminal a region having a plurality of separate areas and served by a plurality of separate user facilities, each of said user facilities being associated with a unique subscriber telephone line other than said servicing telephone line;

presenting to the user of said terminal a video/audio depiction of available services for service selection and input of parameters;

generating signals corresponding to a user service selection and user parameter inputs which define an area within the displayed region to be served by an associated one of the plurality of separate facilities selected by the user;

translating said signals into data defining the selected service and the input parameters; and downloading said data to said SCE through said ISCP to effect service changes to subscriber telephone lines other than said servicing telephone landline, wherein service is changeable such that service orders originating from the selected area are directed to the facility associated with said selected area.

21. A method for advertising or ordering services according to claim 20, further comprising the step of:

presenting to the user of said terminal a video/audio depiction of at least one of service advertising, service description and instructions for using the terminal to arrange for the available services.

22. A method for advertising or ordering services according to claim 20, further comprising the step of:

presenting to the user of said terminal a video/audio depiction of a demonstration of the operation of the service selected by the user.

23. A method for advertising or ordering services according to claim 20, further comprising the step of:

testing the operation of the service selected by the user in a simulated environment with at least some stages of the selected service being displayed as a representation of the type of actions taken during provision of the selected service.

24. A method for advertising or ordering enhanced telephone services offered by an Advanced Intelligent Network (AIN) telephone system having an integrated service control point (ISCP) operatively connected via control signal channels to Service Switching Points (SSP), and a service creation environment (SCE), comprising the steps of:

connecting a terminal to a servicing telephone landline contained in said AIN and connected to an SSP;

displaying separate areas within a facility having an associated plurality of communications devices, each said area having an associated service responsibility;

presenting to a user of said terminal a video/audio depiction of available enhanced services for service selection and input of parameters;

generating signals corresponding to a service selection and parameters input by said user defining a selected area within said facility to be served by an associated one of said plurality of communications devices located within said facility which is connected to a unique subscriber telephone line;

translating said signals into data defining enhanced services and service parameters; and downloading said data to said SCE through said ISCP to effect service changes to subscriber telephone lines other than said servicing telephone landline, wherein service is changeable such that, orders for a service corresponding to the service responsibility associated with the selected area are directed to the communications device associated with said selected area.

25. A method for advertising or ordering services according to claim 24, further comprising the step of:

presenting to the user of said terminal a video/audio depiction of at least one of service advertising, service description and instructions for using the terminal to arrange for the available services.

26. A method for advertising or ordering services according to claim 24, further comprising the step of:

presenting to the user of said terminal a video/audio depiction of a demonstration of the operation of the service selected by the user.

27. A method for advertising or ordering services according to claim 24, further comprising the step of:

testing the operation of the service selected by the user in a simulated environment with at least some stages of the selected service being displayed as a representation of the type of actions taken during provision of the selected service.

* * * * *